Feb. 13, 1923.

G. D. HUNTER 1,444,920

VALVE FOR STONE CUTTING MACHINES

Filed May 3, 1919

Witness:
Jas. E. Hutchinson

Inventor:
George D. Hunter,
By Jos. H. Hunter Attorneys

Feb. 13, 1923. 1,444,920
G. D. HUNTER
VALVE FOR STONE CUTTING MACHINES
Filed May 3, 1919 2 sheets-sheet 2
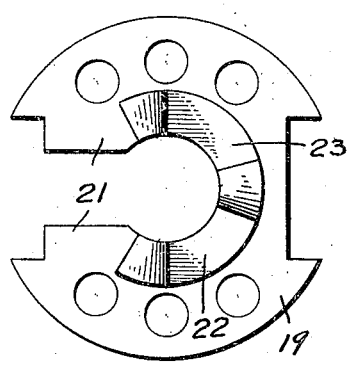
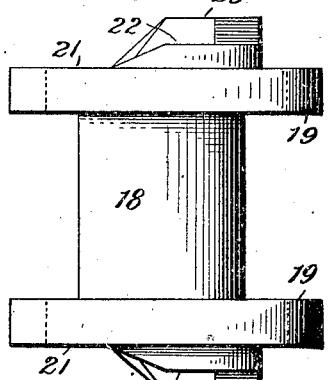
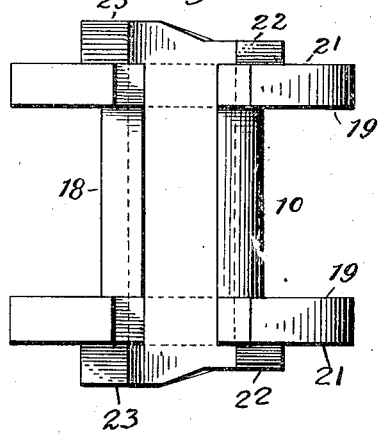
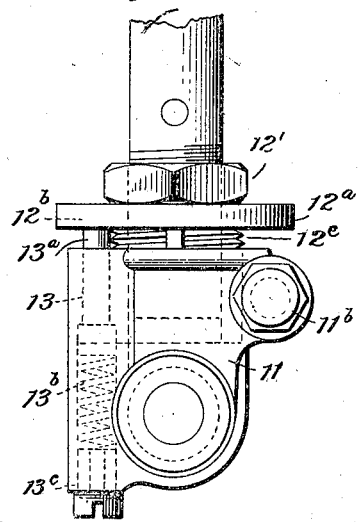
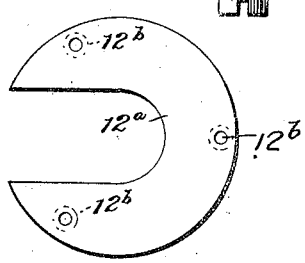
Witness:
Jas. E. Hutchinson.
Inventor:
George D. Hunter,
By Jos. H. Hunter Attorneys.

Patented Feb. 13, 1923.

1,444,920

UNITED STATES PATENT OFFICE.

GEORGE D. HUNTER, OF BLOOMINGTON, INDIANA.

VALVE FOR STONE-CUTTING MACHINES.

Application filed May 3, 1919. Serial No. 294,423.

*To all whom it may concern:*

Be it known that I, GEORGE D. HUNTER, citizen of the United States, residing at Bloomington, in the county of Monroe and State of Indiana, have invented certain new and useful Improvements in Valves for Stone-Cutting Machines, of which the following is a specification, reference being had therein to the accompanying drawing.

The invention relates to improvements in reversing valves for fluid motors being particularly adapted for use in connection with stone channeling machines of the single acting type.

The object of the invention is to provide a valve of this character formed at each end with valve stem engaging surfaces disposed at different heights, so that by a rotary adjustment of the valve stem, the valve stem engaging portions thereof cooperate with any pair of the selected surfaces of the valve, whereby the dwell of the valve is variable to correspondingly vary the reversing point of the fluid piston.

More specifically the invention comprehends a valve for single acting channeling machines having stepped surfaces at each end thereof adapted to cooperate, or be moved by abutting surfaces projecting from the valve stem, the stem being capable of a rotary adjustment so as to permit said abutting surfaces to be moved whereby any one of the stepped portions at each end of the valve may be engaged by the abutting surfaces of the valve stem at the will of the operator. This, of course, permits the dwell of the valve to be varied by reason of the time required in the travel of the valve stem before the abutting surfaces thereof engage the surfaces of the valve, correspondingly regulating the reversing point of the piston whereby the cutters operated by the piston are given a long steady stroke or short sharp strokes.

In the accompanying drawings I have illustrated the preferred embodiment of my invention, but many changes in construction, combination and arrangement of the parts may be made without departing from the spirit thereof.

In the drawings:

Figure 2 illustrates a top plan view showing the arrangement on the valve engaging surfaces of the edges of the valve.

Figure 3 is a detail view of the valve operating stem.

Figure 1:
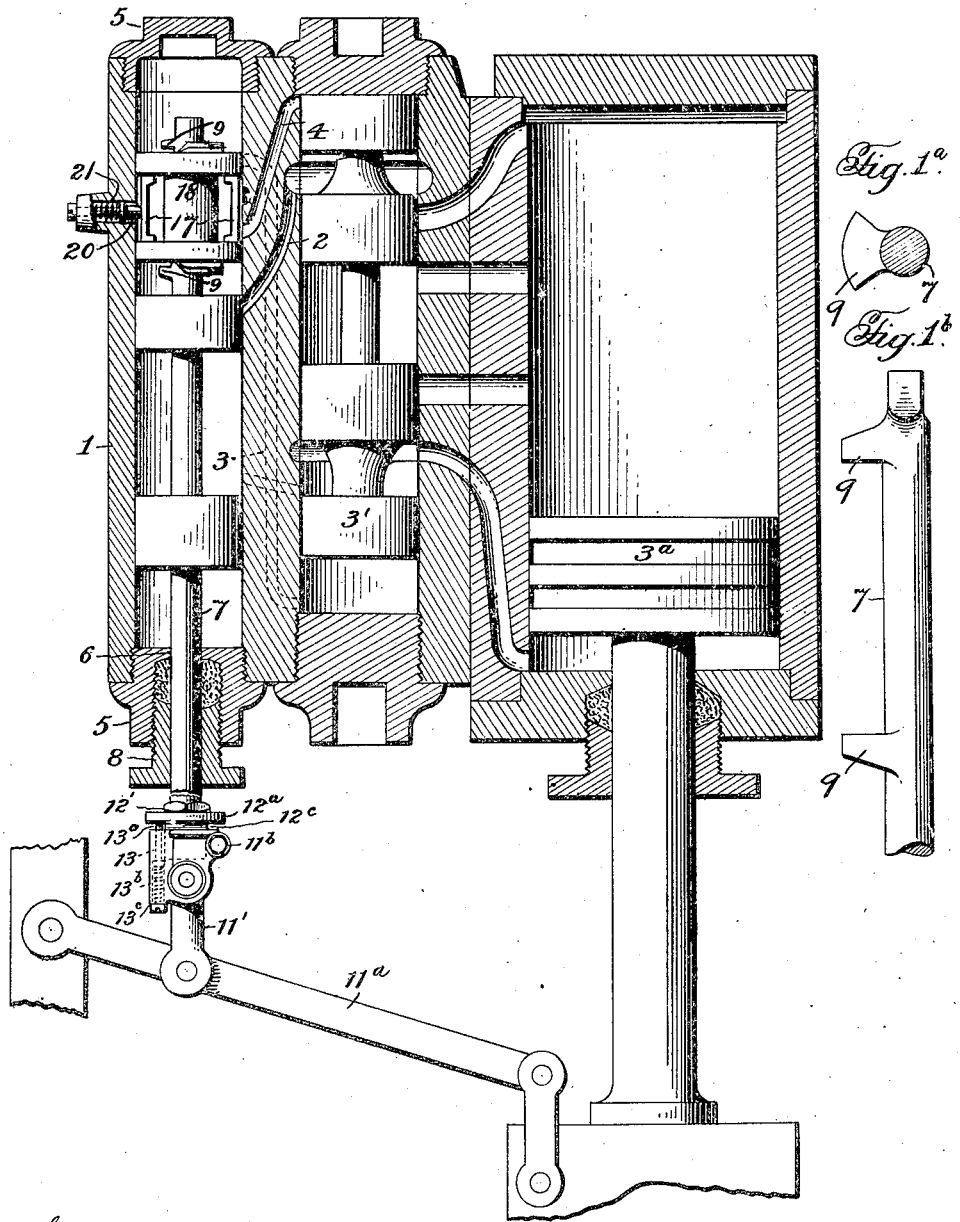
Figure 1 represents a cross sectional view showing the valve reversing chamber with its valve and the operating stem therefor.

Figures 1$^a$, 1$^b$, 4, 5 and 6 are detail views.

Referring now more particularly to the drawings, wherein like reference characters indicate corresponding parts, the numeral 1 designates a reversing valve chest which is preferably of the conventional type having the steam inlet and exhaust pipes leading to the chest or chamber and thence to the steam cylinder, not shown. It may, however, be stated that the steam piston, of course, drives the cutters or drills in the customary way, which is well known to all skilled in the art, and as this forms no part of the present invention the showing of the same is deemed unnecessary.

Leading to the reversing chamber 1 is the fluid or steam inlet 2, and leading from said reversing chamber is the steam passage 3 that leads to the main valve 3' for controlling the passage of steam to the fluid piston 3$^a$. The steam passage 4 leads from the reversing chamber 1 to the opposite side of the main valve casing and these passages of course deliver fluid to the main valve casing for controlling this valve which in turn controls the fluid passing to the steam cylinder.

The reversing chamber has cap portions 5 threaded into each end thereof, one cap portion, preferably the lower one having an aperture 6 therein receiving the valve operating stem 7 passing therethrough and having arranged therearound a gland 8 for preventing the leaking of steam from the reversing cylinder. Near its upper end the valve stem, as clearly shown in Figure 1$^b$ has right angled, preferably segmental shaped abutments 9 spaced apart a distance greater than the length of the reversing valve 10, to be more fully hereinafter described, and adapted to engage and move said valve to control the admission of the motive fluid to the cylinder. In the present showing the abutments are disclosed as being integral with the valve stem, but of course any suitable arrangements may be employed, although the abutting surfaces of the abutments 9 are preferably flat and not of a bevel formation for a reason which will later appear. The valve stem is capable of a rotary adjustment having a threaded engagement at its lower end with a suitable socket 11 that is in turn pivoted to a link 11' operated by the valve lever 11ª. The socket 11 is of a split formation being bound together by means of a bolt 11ᵇ for holding the stem nut 12' when making adjustments to valve stem. The end of the valve stem 7 is provided with a relatively long threaded part receiving thereon a nut 12' against which is placed a plate 12ª having a series of depressions 12ᵇ in its under side, the plate being retained in place by a threaded sleeve 12ᶜ engaging the threaded portion of the valve stem, and holding said plate in any adjusted position by the tightening of the nut 12' to force the same into contact with the sleeve 12ᶜ. The exteriorly threaded portion of the sleeve engages complemental threads in the socket 11 and the tightening of the bolt 11ᵇ holds the sleeve nut 12ᶜ while adjusting the plate 12ª by the nut 12'. The socket 11 has a long one sided aperature 13 extending upwardly therethrough from the bottom and receiving a friction pin 13ª urged upwardly into contact with the plate 12ª by the spring 13ᵇ seated on the threaded screw cap 13ᶜ. It will thus be seen that when it is desired to give the valve stem 7 a rotary adjustment, the valve stem is turned, moving with it the plate 12ª and nut 12' so that the friction pin 13 disengages one of the notches 12ᵇ in the plate. Upon the movement of the stem with its plate and nut 12' and sleeve 12ᶜ another notch 12ᵇ is brought into vertical alinement with the pin 13 whereupon the end of the valve stem is inserted within the socket with the pin in engagement with the walls of one of the notches 12ᵇ and the friction pin, holding the same in its adjusted position, whereby the valve engaging portions of the stem have been moved from out of engagement with one valve stem engaging surface and into engagement with another for a reason which will later appear. This is my preferred means for retaining the valve stem in its adjusted position, but other constructions can be used without departing from the spirit of the invention.

Mounted within the reversing valve chamber, is a reversing valve having the usual reversing valve portion proper 17 and the reversing valve body 18, the two parts of course together forming the reversing valve. The body of the valve has extended therearound near each end an outstanding collar 19 providing a space to receive the reversing valve to move the same in consonance with the movement of the body part. These collar portions 19 may extend entirely around the body of the valve, or only part way around if desired.

It is obviously essential to hold the reversing valve in position against any movement except the movement imparted thereto by the direct action of the valve stem, and to this end a friction pin 20 acted upon by a coiled spring 21 passes through the wall of the reversing valve chamber and engages the body part of the valve 18 to hold the same from moving except when engaged by the stem.

In the stone channeling art it has been found that when starting a cut, light, fast blows are wanted, and as the cut deepens there is slush or mud in the cut that cushions the blow and here a harder blow should be imparted to the cutters, and it will be understood that it is therefore necessary to provide a means for regulating at various times the force of the blow given to the cutters, to meet variable conditions and this is accomplished by varying the dwell of the reversing valve. It is known to all those skilled in the art that frequently material being acted upon is of a rather soft nature and under these conditions a hard blow is desirable and this can be accomplished by varying the dwell of the reversing valve so that the piston operating the cutters is given a more forcible stroke from slower reversing. Then again, when stone of a hard degree is encountered and here light, fast blows are needed, the varying of the dwell of the reversing valve brought in action, varies the reversing point of the piston operating the cutters and gives to the same the variable force most desirable.

The present invention contemplates the provision of a reversing valve capable of performing the functions referred to in the foregoing paragraph, in that the dwell of the valve may be varied at the will of the operator, which in turn varies the stroke or reversing point of the piston. The valve body has arranged on each end thereof valve steam abutment engaging surfaces 21, 22 and 23, all of the surfaces being of different heights, and preferably in step formation. During the operation of the valve stem the abutments 9 engage one surface of the body part of the reversing valve, in an upward movement of the stem, the lower abutment 9 engaging its lower surface to raise or push the valve up and uncover a port to permit the introduction of steam to the end of the main valve, controlling the steam passage to the main cylinder, the valve remaining in this position until it is moved downwardly or lowered against the action of the pin 20 upon the return of the upper abutment 9 which engages the valve body. Assuming that the long and full stroke of the piston is desirable the valve stem 7 is adjusted until the abutments thereof have been moved so that they engage the lower surfaces of the reversing valve body which would be the surface indicated by the reference character 22. Then upon an upstroke of the valve stem when the abutment reaches a position to engage this surface the valve would be raised permitting the fluid to enter through the port 3 of the top end of the main valve chamber which opens the communication to the pressure cylinder and this inflow of fluid continues to the main valve chamber through to the pressure cylinder until the valve stem has been lowered upon the down stroke of the pressure piston to such an extent as to enable the upper abutment 9 to engage its surface 22, this requiring a considerable period of time to make the necessary travel before the abutment can engage the surface, thus allowing a large volume of fluid to enter the pressure cylinder for the heavy, dirty work, before it is reversed. As above stated, the upstroke of the valve stem moves the reversing valve to permit steam to enter the top portion of the main valve chamber, while the return or down stroke of the valve permits steam to enter the bottom of the main valve chamber and correspondingly operate this main valve. It will be understood that the time element necessary for the abutments to travel before they exert any influence on the reversing valve permits the dwell of the valve to be correspondingly controlled. The reversing valve controls the admission of fluid to the main valve so that if the reversing valve is held in a position to keep the port open to the main valve, the main valve will be held open a considerable period allowing a sufficient volume of steam to pass to the pressure cylinder to meet heavy duty requirements. When less power to piston is desired, then the valve stem is adjusted until the abutments thereof are in line with the highest engaging surfaces 22 of the reversing valve, and the stem is held in its adjusted position by reason of the socket connection between the lower end of the valve stem and the link by the plate 12ª and the friction pin 13. When the time of travel for these abutments to engage their surfaces is very limited, the valve is not allowed to dwell in any position for a considerable period, this causing a closing of the steam supply and an early reversing of the valve and piston.

The various parts of the mechanism having been described, the operation of the valve may be briefly stated as follows:

When it is desired to meet requirements other than heavy duty work, such for instance as starting a cut, or the cutters working in an open end cut or upon hard stone necessitating the use of a lighter and faster blow of the drills, then the appropriate step on the reversing valve brought into vertical alinement with the operating members of the valve stem to cause a light and quick blow to be imparted to the cutters by an early reversing of the valve. It will be understood that an early reversing of the piston gives a lighter and faster blow than a slower reversing of the piston, which reversing of the piston is, of course, controlled by the length of the dwell of the reversing valve.

Having thus described the invention, what I claim is:

1. In a machine of the character described, a reversing valve and means for operating the same, said reversing valve comprising a body portion, an outwardly extending flange formed on each end of the body portion, and a stepped engaging surface formed on the outer face of each flange, the stepped engaging surfaces adapted to be engaged by the operating means for varying the dwell of the valve.

2. In a machine of the character described, a reversing valve and means for operating the same, said reversing valve comprising a body portion, an outwardly extending flange on each end of the body, a stepped engaging surface on each end of the body adapted to be engaged by the operating means, and valve faces carried by the body between the outwardly extending flanges.

3. In a machine of the character described, a reversing valve, said valve comprising a body portion having an opening therethrough, an arcuate shaped stepped engaging surface on each end of the body, a valve stem extending through and rotatable in the opening in the body, and projections on the valve stem adapted to engage the stepped engaging surfaces.

4. The combination with a reversing valve chamber, of a reversing valve and a valve stem for reciprocating the valve, the valve comprising a body portion of less diameter than the chamber, an outwardly extending flange on each end of the body of a diameter to engage the inner wall of the chamber, a stepped engaging surface on the outer face of each flange, and valve faces carried by the body between the flanges, and the valve stem having projections adapted to engage the stepped engaging surfaces of the valve.

In testimony whereof I affix my signature in presence of two witnesses.

GEORGE D. HUNTER.

Witnesses:
W. M. LOUDEN,
MORTON T. HUNTER.